United States Patent
Grosse-Plankermann et al.

(10) Patent No.: US 8,534,603 B2
(45) Date of Patent: Sep. 17, 2013

(54) SYSTEM AND METHOD FOR MANUFACTURING A VEHICLE CABIN

(75) Inventors: Peter Grosse-Plankermann, New Wulmstorf (DE); Martin Pätz, Hamburg (DE); Philipp Junge, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 103 days.

(21) Appl. No.: 13/314,788

(22) Filed: Dec. 8, 2011

(65) Prior Publication Data

US 2012/0145828 A1    Jun. 14, 2012

Related U.S. Application Data

(63) Continuation of application No. PCT/EP2010/057051, filed on May 21, 2010.

(60) Provisional application No. 61/184,916, filed on Jun. 8, 2009.

(30) Foreign Application Priority Data

Jun. 8, 2009    (DE) .......................... 10 2009 024 157

(51) Int. Cl.
*B64D 11/00*    (2006.01)
*B64C 1/00*    (2006.01)

(52) U.S. Cl.
USPC .................. 244/118.5; 244/119; 244/120

(58) Field of Classification Search
USPC .................. 244/118.5, 119; 52/64; 220/720, 220/23.9
See application file for complete search history.

(56) References Cited

U.S. PATENT DOCUMENTS

| | | | |
|---|---|---|---|
| 4,799,631 A * | 1/1989 | Humphries et al. | 244/118.5 |
| 5,024,398 A | 6/1991 | Riedinger et al. | |
| 5,083,727 A | 1/1992 | Pompei et al. | |
| 5,855,291 A * | 1/1999 | Ingle | 220/6 |
| 7,987,596 B2 * | 8/2011 | Ritts et al. | 244/118.5 |

(Continued)

FOREIGN PATENT DOCUMENTS

| | | |
|---|---|---|
| DE | 102006017596 A1 | 10/2007 |
| DE | 102006048376 A1 | 4/2008 |

(Continued)

OTHER PUBLICATIONS

International Search Report dated Aug. 27, 2010 for International Application No. PCT/EP2010/057051.

*Primary Examiner* — Joseph W Sanderson
*Assistant Examiner* — Marc Burgess
(74) *Attorney, Agent, or Firm* — Ingrassia Fisher & Lorenz P.C.

(57) ABSTRACT

A system for manufacturing a vehicle cabin includes, but is not limited to at least one first installation component, at least one first surface element, and at least one guide element. The first surface element is slidably arranged on the first installation component with the guide element to form a cabin module, and the guide element is lockable in at least one assembly position and at least one operating position. The resultant cabin module in the assembly position includes, but is not limited to outer dimensions enabling incorporation into a fuselage section of a vehicle, so that the cabin module in the operating position can make up at least a section of the cabin in the fuselage section of the vehicle.

18 Claims, 8 Drawing Sheets

(56) References Cited

U.S. PATENT DOCUMENTS

| | | |
|---|---|---|
| 2004/0016847 A1 | 1/2004 | Ritts |
| 2005/0184194 A1* | 8/2005 | Schaefer et al. ............ 244/118.1 |
| 2006/0101631 A1* | 5/2006 | Zeigler ........................ 29/281.1 |
| 2007/0241231 A1 | 10/2007 | Meyer-Rusitschka et al. |
| 2008/0283662 A1* | 11/2008 | Park ............................ 244/118.5 |
| 2009/0230244 A1* | 9/2009 | Kofinger et al. ............ 244/118.5 |
| 2009/0250554 A1 | 10/2009 | Graeber et al. |
| 2011/0024565 A1 | 2/2011 | Koefunger et al. |
| 2011/0133027 A1* | 6/2011 | Graeber et al. ............ 244/118.5 |

FOREIGN PATENT DOCUMENTS

| | | |
|---|---|---|
| DE | 102007050422 A1 | 4/2009 |
| EP | 0035955 A2 | 9/1981 |
| WO | 2008043557 A1 | 4/2008 |

* cited by examiner

SYSTEM AND METHOD FOR MANUFACTURING A VEHICLE CABIN

REFERENCE TO RELATED APPLICATIONS

This application is a continuation of International Application No. PCT/EP2010/057051, filed May 21, 2010, which claims priority to German Patent Application No. 102009024157.4 filed Jun. 8, 2009 and of U.S. Provisional Patent Application No. 61/184,916, filed Jun. 8, 2009, the disclosures of which are hereby incorporated herein by reference.

TECHNICAL FIELD

The technical field relates to a system for manufacturing a vehicle cabin, a method for manufacturing a vehicle cabin, the use of such a system in a fuselage section of an aircraft, as well as an aircraft with at least one fuselage section and at least one system.

BACKGROUND

In larger vehicles used for transporting people, passenger cabins are usually in designated sections of the vehicle. To this end, it is common to join a series of cladding elements, cabin equipment components and larger cabin systems with a structure, for example the primary structure, of the vehicle at several locations by means of retainers and fastening elements. For optical considerations, such retainers and fastening elements are concealed, so as to not be visible to the passenger in the completed cabin.

As a departure from the above, there exist concepts in which parts of the cabin equipment are incorporated to some extent preassembled into an open vehicle fuselage. For example, US 2007/0241231 A1 and DE 10 2006 017 596 A1 disclose floor elements for individual sections of a vehicle cabin with equipment components arranged thereupon, such as stools, beds and the like, which are enhanced by additional cladding elements, monuments and the like. DE 10 2006 048 376 A1 and WO 2008/043557 A1 disclose a cantilever cabin structural unit that can be secured to an aircraft structure for the attachment of built-in cabin elements for an aircraft.

It could be interpreted as disadvantageous to have to use an abundance of different retainers and fastening elements for various cladding elements and cabin equipment components for manufacturing a passenger cabin. In addition, each retainer and each fastening element must be secured to the primary structure of the vehicle, for example, so that it must also be configured for this purpose, so that no excessive weakening of the primary structure comes about for all conceivable cabin variants. In addition to the high integration outlay, the retainers and fastening elements must be stockpiled and provided, which can negatively affect the economic efficiency in manufacturing an aircraft cabin. Finally, the designated fuselage section is blocked by assemblers and technicians during the complicated manual integration of the cladding elements and cabin equipment components, which delays other, subsequent, or parallel work to be conducted on the vehicle.

Consequently, at least one object is to provide a system for manufacturing a vehicle cabin that diminishes or entirely eliminates the aforementioned disadvantages. In particular, at least one object may involve proposing a system for manufacturing a vehicle cabin that permits a flexible configuration thereof, but in equal measure can be integrated into the vehicle fuselage with the lowest possible number of different retainers and fastening elements. At least a further object may involve reducing the integration time for manufacturing the cabin inside the vehicle, for example so that its interior space is blocked for the least possible period of time when assembling the equipment of the vehicle. In addition, other objects, desirable features, and characteristics will become apparent from the subsequent summary and detailed description, and the appended claims, taken in conjunction with the accompanying drawings and this background.

The system according to an embodiment for manufacturing a vehicle cabin comprises at least one first installation component, at least one first surface element, and at least one guide element. The first surface element is slidably arranged on the first installation component by means of the guide element. The guide element can be locked in at least one assembly position, and in at least one operating position. The grouping comprised of the first surface element, the guide element and the first installation component forms a cabin module, which comprises outer dimensions enabling incorporation into the fuselage of a vehicle. In the operating position, the cabin module makes up at least a portion of the cabin in the fuselage of the vehicle.

A cabin can have a combination of installation components, which predominantly extend in all spatial dimensions, and cladding components with an overall flat and often curved shape. The designation of the at least one first surface element is used to denote those elements that are essentially flat, for example lining panels ("lining panels"), ceiling panels ("ceiling panels") and the like.

An installation component can be viewed as any conceivable component that usually is arranged in a vehicle cabin. This can include storage compartments, storage cabinets, kitchen elements, onboard toilets, cabin sections and the like that extend in all spatial directions. However, the invention is not limited to one of the cited installation components; rather, the flexibility of the system according to the invention makes any installation component suitable to contribute to the advantageous use of the system according to the invention. As a consequence, it is conceivable in special instances inside a cabin to be realized that this first installation component also be understood as a flat component, such as a separating wall, a section wall or a cladding element, so that the system allows areas in the vehicle without installation components extending in all spatial dimensions to yield an easy to manufacture cabin.

The guide element is used to mount the surface element on the installation component in a guided fashion. The guide element can also be realized using any embodiments that do not limit the embodiments. The guide path to be realized by the guide element is also not limited to specific embodiments; rather, both straight and curved guide paths can be realized. Also conceivable are rotational motions by means of hinge-like devices. In addition, it also makes no difference how many components the guide element comprises, and which of the components are arranged on the installation component and which of the components are arranged on the surface element.

The guide element is primarily intended to establish a connection between the surface element and installation component. In equal measure, it must be possible to lock the guide element in at least one assembly position and at least one operating position. This can be realized by a plurality of different locating devices that exert a non-positive or positive effect.

When in the assembly position, the cabin module with surface element, guide element and installation component comprises outer dimensions that enable incorporation into an open fuselage of the aircraft, so that the cabin module can be manufactured outside of the vehicle fuselage. This eliminates the need to block the designated fuselage section while assembling the equipment of the vehicle. The level of prefabrication makes it possible to significantly cut the time required for integration into the fuselage section of the vehicle.

In the operating position, however, the cabin module can comprise the kind of shape where it forms at least one section of the cabin, preferably running in the longitudinal direction. By being locked in the operating position, the cabin module can remain in the desired form, and be permanently used as a cabin section.

The general objective is to narrow the cross section of the cabin module using the guide element and relative motion it enables between the installation component and surface element, so that the preassembled cabin module can be introduced into the open fuselage of the vehicle without colliding with its structure.

Let it be noted now that, when using several surface elements, all of these surface elements do not absolutely have to be mounted on an installation component via guide elements. For example, if ceiling panels are mounted on spatial installation components by means of guide elements, lateral cladding elements could be rigidly arranged on these installation components, since even if slidably guided they would do virtually nothing in the way of reducing the outer dimensions of the cabin module. On the other hand, these lateral cladding elements could also be pivoted to the respective installation components, as a result of which another narrowing can be brought about in the floor region.

The system according to an embodiment achieves at least one object by virtue of the fact that the prefabrication of cabin modules initially reduces the time to be spent in the vehicle fuselage. In addition, it enables a very flexible configuration of the cabin. The number of fastening elements and retainers necessary in the fuselage can be diminished given the self-supporting nature of the cabin modules manufactured with the system according to the invention, which can continue to be situated predominantly at the same, standardized positions for all conceivable embodiments.

One advantageous embodiment of the system according to the invention comprises fastening elements for securing the cabin module to a floor of the passenger cabin. These fastening elements are set up to mount the cabin module in the operating position, thereby establishing the position relative to the vehicle fuselage, and allowing the self-supporting cabin module to ensure a reliable accommodation of passengers inside the vehicle. The fastening elements can comprise any shape desired that permits the reliable mounting of such a cabin module.

In an embodiment, the fastening elements for attachment to a floor in the cabin are designed as floor rails that can be secured to the floor structure. These floor rails can preferably be realized in the same way as seat rails for accommodating passenger seats that are usually found in larger passenger cabins.

In another embodiment of the system, the at least one guide element is realized by means of a guide rail and at least one runner that can slide in the guide rail. The runner can preferably be locked to the guide rail by moving relative to the guide rail in a direction not lying on the guide path. For example, this could be realized by lifting, pressing, turning or some other possible movements, as a result of which the runner plunges into a corresponding depression or pocket in the guide rail, bringing about a positive interlock.

In an embodiment of the system, the runner has a shape that allows a gliding motion within the guide rail if the runner is aligned to extend in the direction parallel to the guide path, while establishing a lock relative to the guide given another alignment. As a result, for example, the runner with an oval or oblong shape could be turned to enable a reliable locking of the guide element in one or more positions, such as the assembly position and operating position.

In another embodiment of the system, the at least one first installation component comprises an opening at a bounding face that makes it possible to lock the guide element in place from outside the installation component. For example, if the installation component is realized as a storage compartment, and the guide element is arranged on an upper bounding face of the storage compartment, a runner could only be operated with relative difficulty. The runner could be shaped in such a way as to project out of a side of the guide rail facing the installation component at least in specific positions, allowing it to be brought into a locked position through a corresponding opening in this installation component by turning, pulling or pressing. This facilitates the assembly of guide elements that might not be visible and be covered.

In another embodiment of the system, the at least one installation component comprises at least one locating surface with at least one retaining body for accommodating at least one second installation component. The retaining body could be designed in such a way as to enable a reliable non-positive or positive mounting of second installation components. Hook or wedge-shaped configurations are conceivable. If the cabin has several cabin modules that can be inserted one after the other into the designated fuselage section of the vehicle, the retaining bodies can be designed in such a way as to enable a successive insertion of second installation components on cabin modules already located in the designated fuselage section. Any ensuing second installation component can be used to support the preceding second installation component if the second installation components are also distributed over the designated fuselage section.

At least one of the objects is additionally achieved by means of a method for manufacturing a cabin. This method provides at least one first surface element, at least one first installation component, and at least one guide element. The surface element is arranged on the first installation element with the guide element.

As implied by the designation "at least", several first installation components and surface elements can also be combined with each other to form a collapsible or telescoping cabin module. The resultantly formed cabin module is moved into an assembly position in which the guide element is locked in an assembly position. The cabin module is introduced into the designated fuselage section, and there secured to a retaining element on the cabin floor.

In an embodiment of the method, second installation components are arranged on locating surfaces of a first installation component that comprise retaining bodies and there fastened.

At least one object is further achieved with an installation component for a passenger cabin of a vehicle equipped with a guide rail arranged on at least one bounding face, in which a runner can be slidably arranged and locked in an assembly position or operating position. The first installation component is designed as an overhead storage compartment.

Finally, at least one object is achieved by using a system according to an embodiment for manufacturing a cabin in an aircraft, as well as with an aircraft having at least one designated fuselage section and at least one system according to an embodiment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

FIG. 1a to FIG. 1d show two first installation components 2 and 4, on which are arranged a first surface element 6 and a respective second surface element 8 and 10. The first installation components 2 and 4 in the embodiment depicted are designed as overhead storage compartments of the kind frequently encountered in passenger cabins of aircraft. The respective upper side 12 or 14 of the first installation components 2 and 4 each comprise several, for example four, guide elements 16 realized as guide rails, which are preferably arranged in the extension of reinforcing ribs 17 of the first surface element 6, wherein the reinforcing ribs 17 meet on the top side 12 or 14. Ends of the first surface element 6 are slidably mounted in the guide elements 16. This grouping can be referred to as the cabin module 18.

Figure 1A:
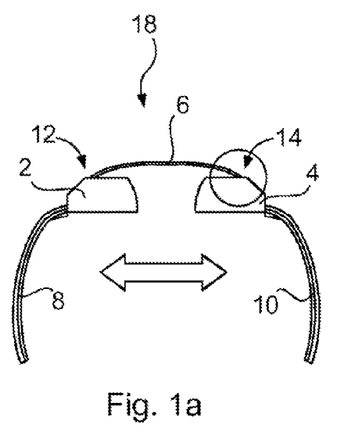
FIG. 1a to FIG. 1d show an embodiment of the system based on two two-dimensional and associated three-dimensional representations.
Figure 1B:
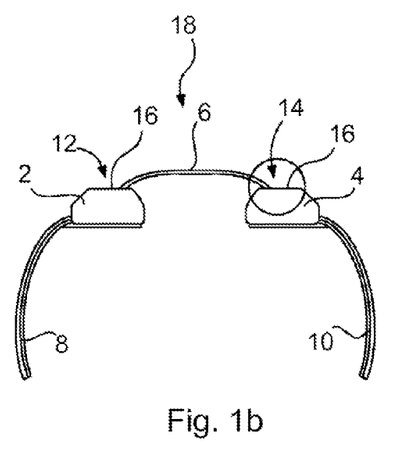
Figure 1C:
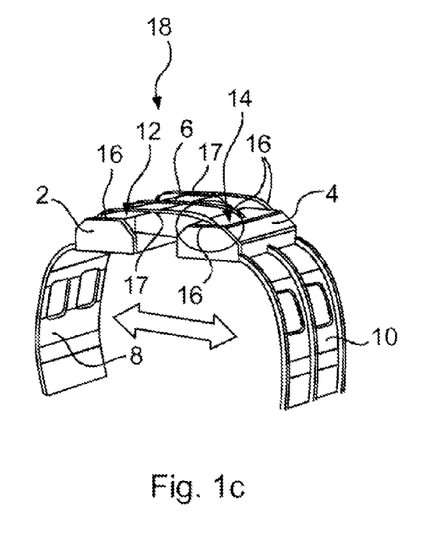

Visible on FIG. 1a and FIG. 1c is an assembly position in which the ends of the surface element 6 are arranged in an area of the guide element 16 lying relatively far to the outside. As a result, the cabin module 18 has the smallest possible width, since the distance between the two first surface elements 6 and 8, respectively, the two second surface elements 8 and 10 is diminished. This makes it possible to insert the cabin module 18 into an open vehicle fuselage.

Figure 1D:
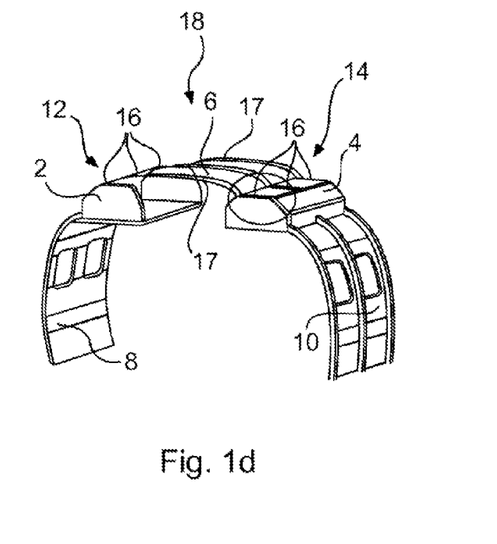

Assumed on FIG. 1a and FIG. 1d is a so-called operating position, in which the ends of the first surface element 6 are arranged in areas of the guide elements 16 lying relatively far to the inside. As a result, the first installation components 2 and 4 along with the second surface elements 8 and 10 lie relatively far to the outside, so that the width of the cabin module 18 is considerably greater than in the assembly position. Consequently, the second surface elements 8 and 10 can be adjusted to the inner contour of the vehicle fuselage, wherein the first installation components 2 and 4 are additionally situated in their respective end position.

Figure 2A:
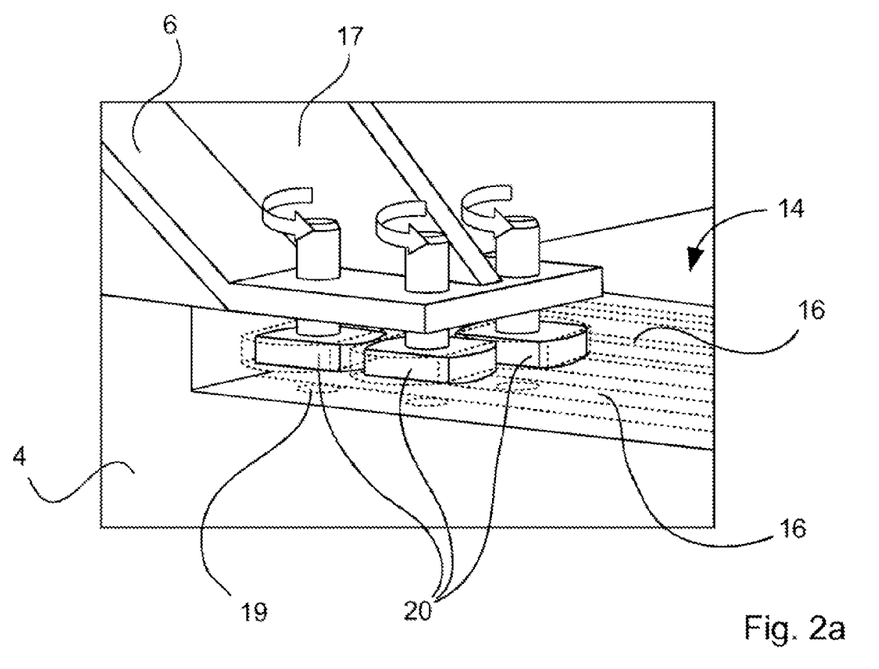
FIG. 2a and FIG. 2b show a three-dimensional, detailed view of a runner in a guide rail.
Figure 2B:
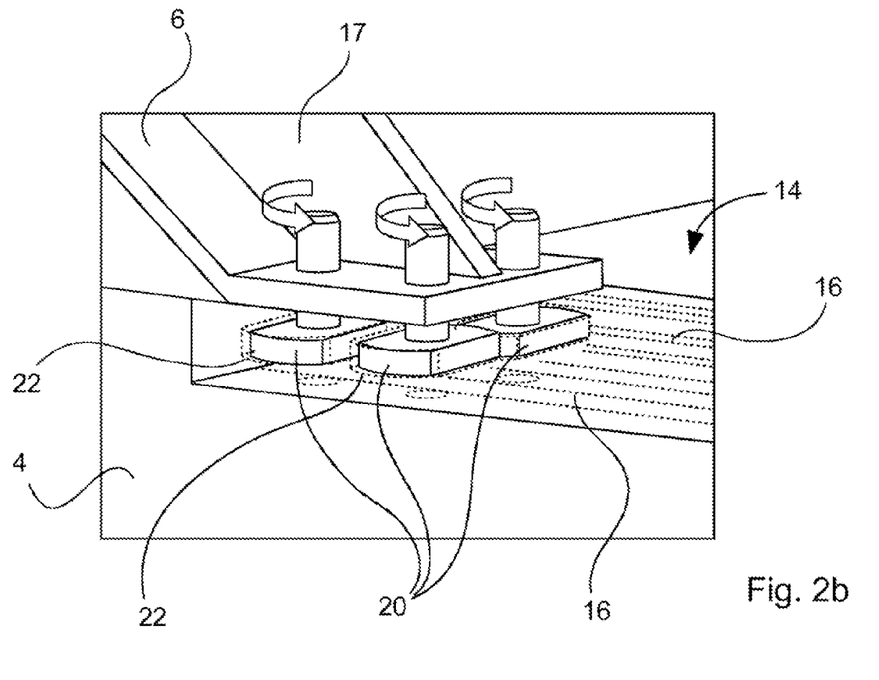
Figures 3A, 3B, 3C, 3D:
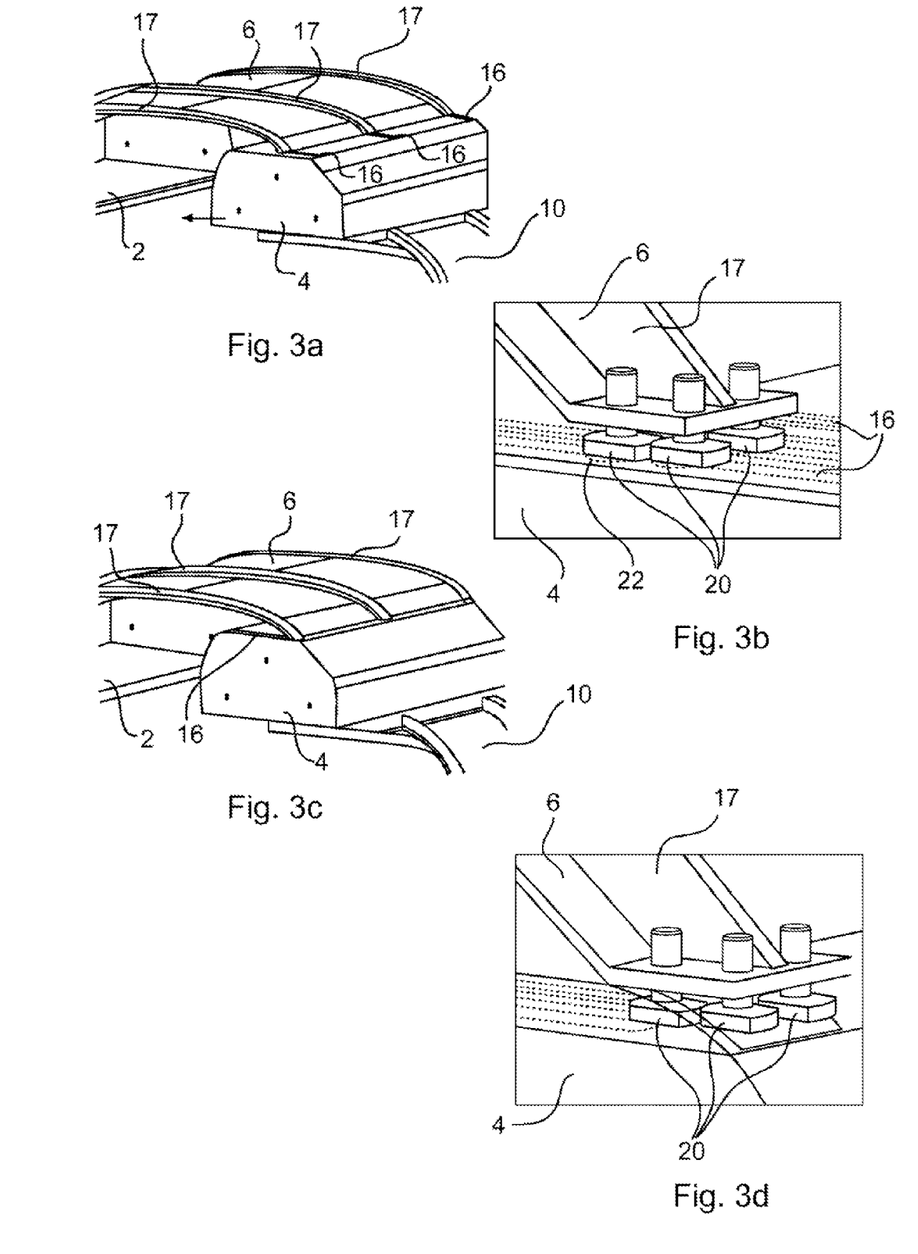
FIG. 3a to FIG. 3d show the assembly position and disassembly position along with the guide element in three-dimensional views.

FIG. 2a and FIG. 2b present a detailed, sectional view of two guide elements 16 arranged next to each other on the top side 14 of a first installation component 4, which incorporate several oval or oblong runners 20 that can freely shift inside the guide elements 16. In the example shown, the runners 20 are rotatably mounted on the first surface element 6, and can be turned from a first position depicted on FIG. 2a into a second position evident on FIG. 2b. If the runners 20 are aligned as shown on FIG. 2b, their exemplary oblong shape causes them to enter into a positive and/or non-positive bond with correspondingly shaped pockets 22 in the guide rail. This means that the first installation component 4 and first surface element 6 cannot move relative to each other any longer in this bond. This assists in a reliably lock of the first surface element 6 in an operating position or assembly position.

In order to also move a cabin module 18 introduced into a vehicle fuselage to an operating position and lock it in place there, it must be possible to operate the runners 20 from inside the cabin module 18. To this end, the first installation component 2 or 4 could comprise an opening 19, through which a respective operating end of a runner 20 can be reached. The runners 20 could for this purpose be designed so that movement along a straight line from the inside of a first installation component 2 or 4 initiated by pressure exerted by an assembler or suitable device generates a rotation by the respective runner 20, thereby moving the latter out of the locked into the sliding state.

FIG. 3a to FIG. 3d further show that the system according to the invention can assume not just an assembly position (FIG. 3a and FIG. 3b), but rather that it can also assume a disassembly position for dismantling the first installation component 4, in which the first surface element 6 occupies an area of the guide elements 16 lying very far to the outside, so that, given outwardly opened guide elements 16, the runners 20 can exit the latter at the end of the guide element 16 lying to the outside, and the first installation component 4 can be dismantled accordingly.

Figure 4A:
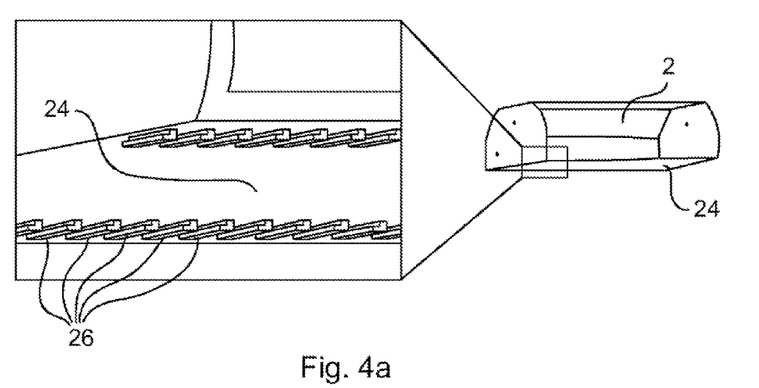
FIG. 4a to FIG. 4c show the process of securing second installation components to locating surfaces of first installation components.
Figure 4B:
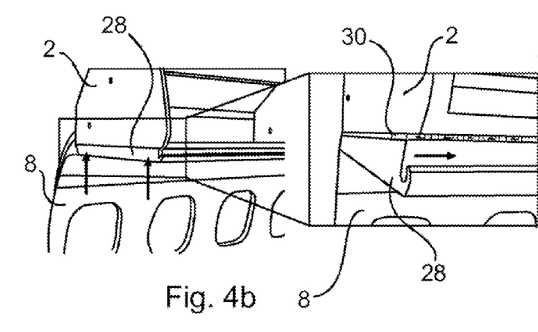
Figure 4C:
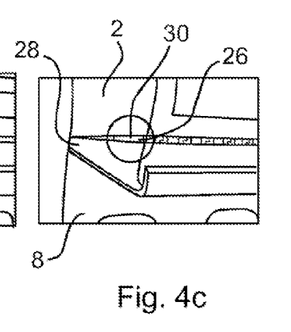

As shown on FIG. 4a to FIG. 4c, the first installation components 2 and 4 can additionally comprise a locating surface 24 provided with hook-shaped first retaining bodies 26. Installation components 28 can be secured thereto, for example as depicted here by introducing or incorporating correspondingly shaped second retaining bodies 30.

For example, if desired by the customer, a cabin of an aircraft can accommodate different classes with varied seat configurations. One or more second installation components 28 could constitute a supply channel, for example, which could comprise controls, reading lamps, displays, air showers and the like. This supply channel must be adapted to the varied seat configurations to ensure operability and usability, and could be changed out quickly on a locating surface 24 using the first retaining bodies 26 depicted. For example, the first retaining bodies 26 could here be spaced an inch apart from each other, corresponding to the spacing of two adjacent modular points in a seat rail in a cabin floor.

A supply channel having several second installation components 28 could here be assembled in three essential steps. In the first step, the second installation component 28 is lifted to the locating surface 24 and positioned precisely in the gaps of the first retaining body 26. By shifting the second installation component 28 in the longitudinal direction, all first retaining bodies 26 are positively hooked into the corresponding second retaining bodies 29. If the first retaining bodies 26 and second retaining bodies 29 should taper, a non-positive bond can simultaneously be formed by means of clamps. In addition, a lock in the form of a hinged and detachable snapping mechanism at the end of a cabin module 18 could prevent the entire supply channel comprised of second installation components 28 from moving in the longitudinal and transverse direction. Safeguarding the respectively provided functions requires pneumatic and electrical interfaces, whose corresponding configuration as quick-lock couplings or the like ensure not only a reliable function, but also a quick replacement.

Figure 5A:
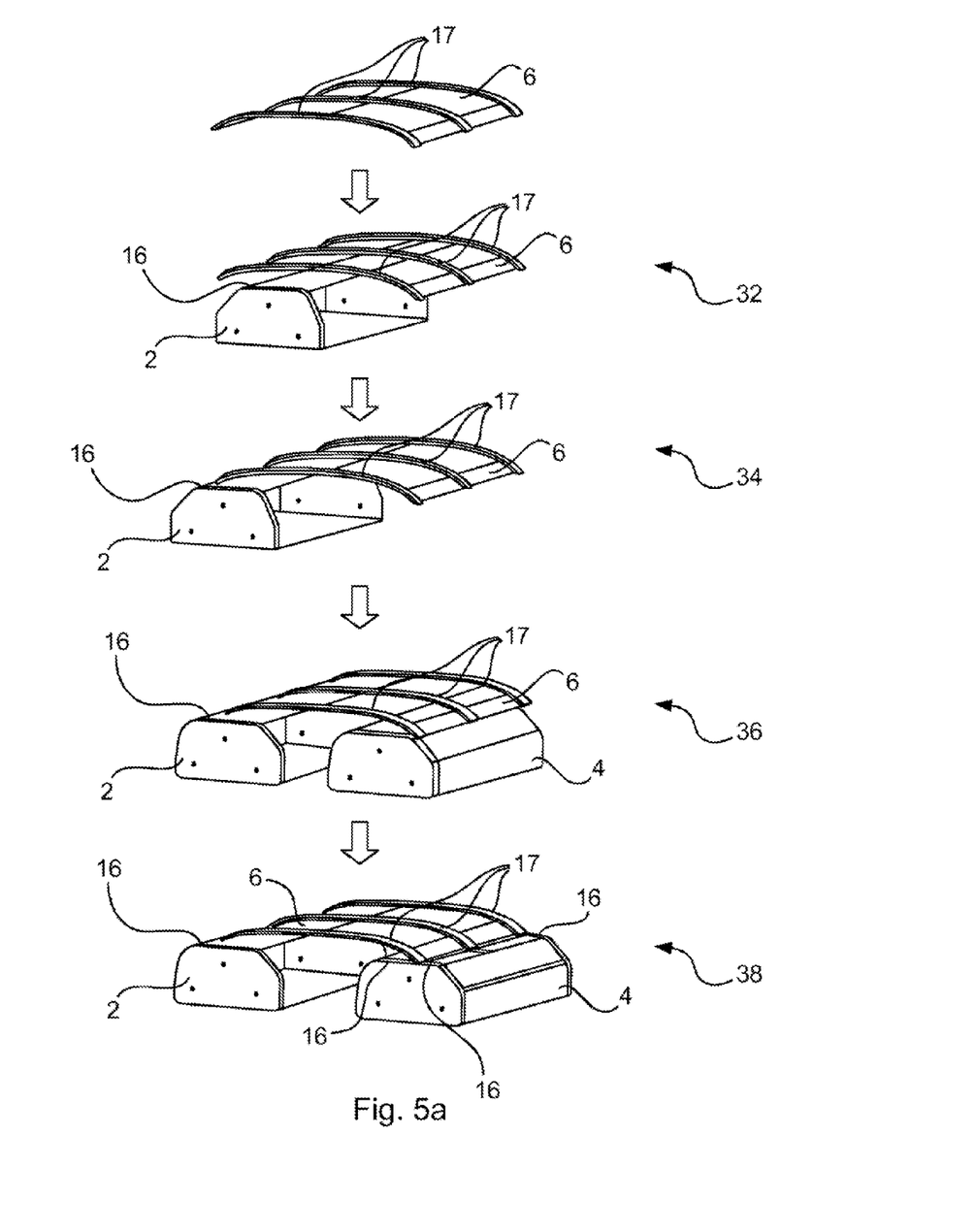
FIG. 5a and FIG. 5b show the process of manufacturing a cabin module using the system according to an embodiment.
Figure 5B:
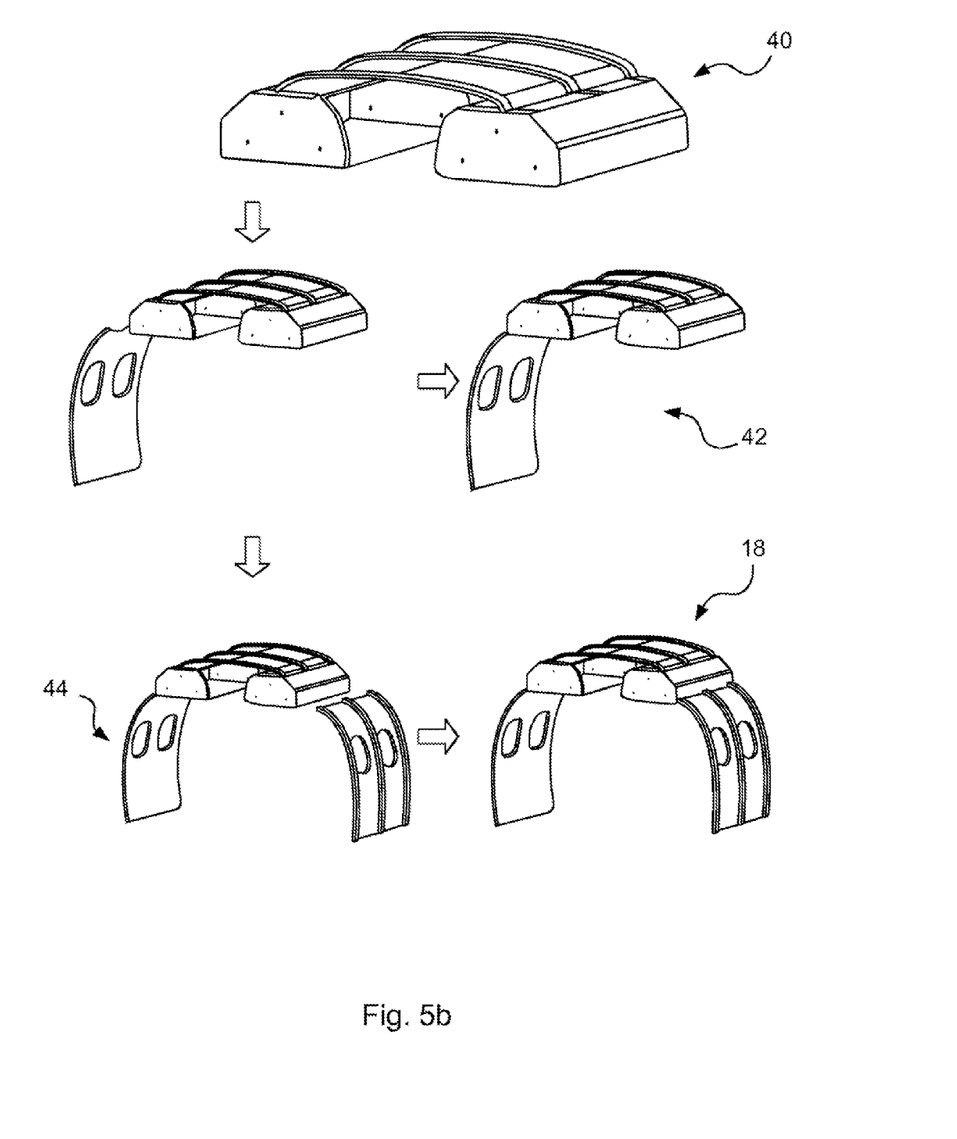
Figure 6A:
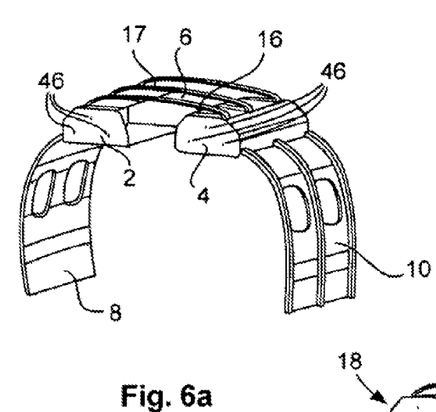
FIG. 6 shows the sequential arrangement of several cabin modules.
Figure 6B:
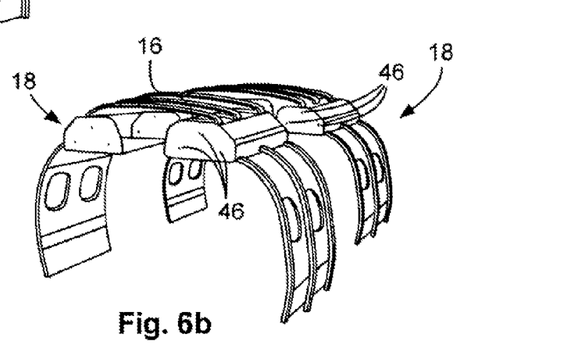
Figure 6C:
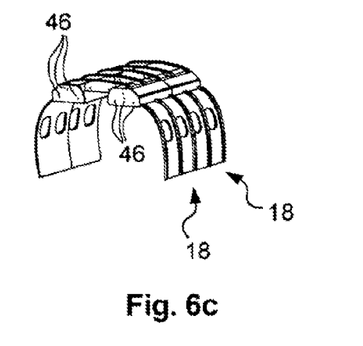
Figure 6D:
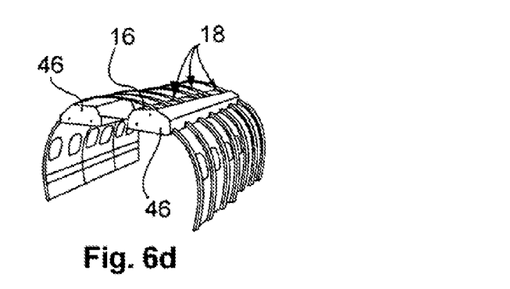
Figure 6E:
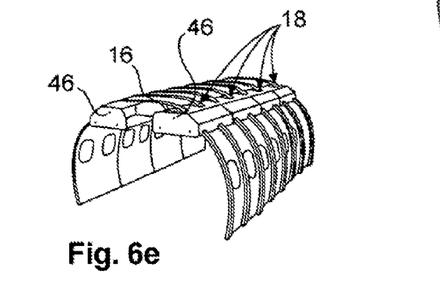
Figure 7A:
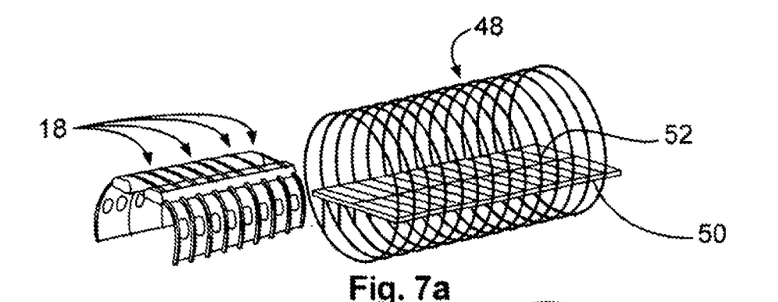
FIG. 7 shows the process of manufacturing a cabin using several cabin modules.
Figure 7B:
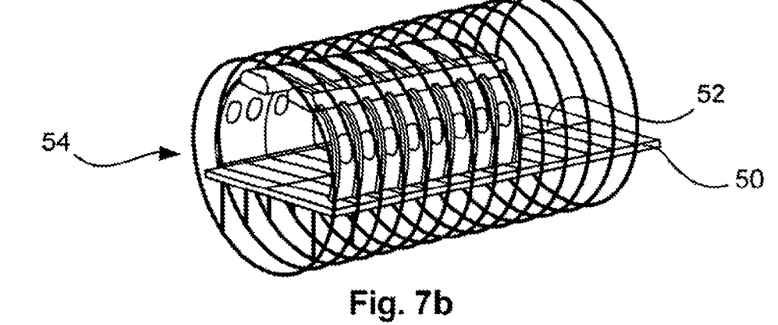
Figure 7C:
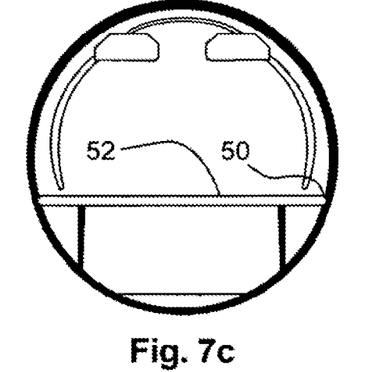
Figure 7D:
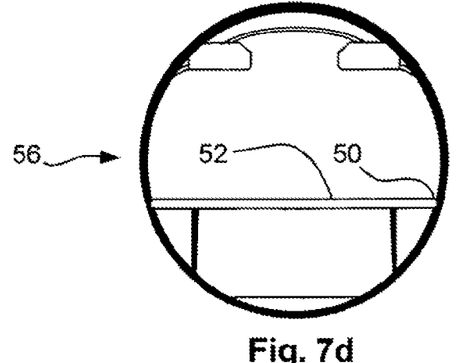
Figure 7E:
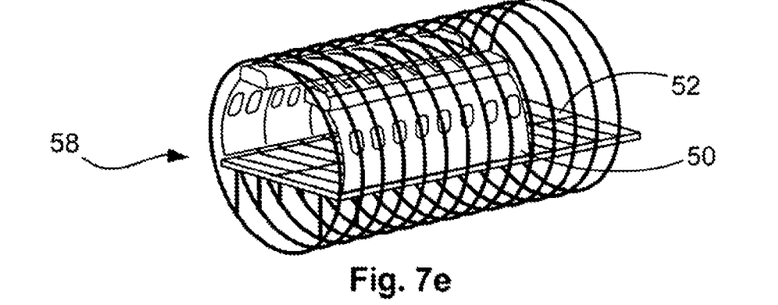

FIG. 5a and FIG. 5b show the manufacture of a single cabin module 18, in which a first surface element 6 in the form of a ceiling panel 32 is first lifted, connected 34 by means of several guide elements 16 with a first installation component 2, subsequently connected 36 with another first installation component 4, and finally locked in an assembly position 38. The grouping of a first surface element 6 and first installation component 2 and 4 is then lifted 40, so that a second surface element 8 is arranged 42 on the first installation component 2, and a second surface element 10 is arranged 44 on the first installation component 4. This could be accomplished using bolts introduced into holes of the first installation components 2 and 4, as well as corresponding holes of the second surface elements 8 and 10, and there secured. Finally, the cabin module 18 is completed, and can be introduced into an opened fuselage of a vehicle in the depicted assembly position.

In order to ready a cabin extending over the entire length of the designated fuselage section, several cabin modules 18 can be interconnected, for example by placing them adjacent to each other and bracing them together with corresponding fastening means. The cabin modules 18 could be connected in the area of the first installation components 2 and 4, which for this purpose comprise holes 46 through which connecting elements can be passed and correspondingly braced.

Finally, FIG. 7 shows how a grouping of several cabin modules 18 can be introduced into a designated fuselage section 48 of a vehicle. Beforehand, fastening elements 50 realized as floor rails are arranged on a floor structure 52 where the modules 18 are to be mounted. A movable device (not shown) can be used to bring the grouping consisting of several cabin modules 18 into the fuselage section 54, and then lock 56 them in an operating position once the final location has been reached. After the modules 18 have been attached 58, for example by joining lower ends of the second surface elements 8 and 10 with the floor rails 50, the cabin of the vehicle is ready for use.

In addition, let it be noted that "encompassing" and "comprising" do not preclude any other elements or steps, and that "an" or "a" do not rule out a plurality. Let it further be noted that features or steps described with reference to one of the above exemplary embodiments can also be used in combination with other features or steps of other exemplary embodiments described above. Reference numbers in the claims are not to be construed as limitations Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for manufacturing a vehicle cabin for a vehicle, comprising:
   at least one stowage compartment;
   at least one ceiling panel; and
   at least one guide element,
   wherein the at least one ceiling panel is slidable transverse to a longitudinal axis of the vehicle relative to the stowage compartment on the at least one guide element to form a cabin module,
   wherein the at least one guide element is lockable in at least one assembly position and at least one operating position,
   wherein the cabin module in the assembly position comprises the at least one ceiling panel slid relative to the at least one stowage compartment in a first position such that the cabin module has a first outer dimension sized to enable incorporation into a fuselage section of a vehicle, and
   wherein the cabin module in the operating position includes the at least one ceiling panel slid relative to the at least one stowage compartment in a second position such that the cabin module has a second outer dimension, which is greater than the first outer dimension so that the cabin module makes up at least a section of the vehicle cabin in the fuselage section of the vehicle.

2. The system of claim 1,
further comprising fastening elements configured to secure the cabin module to a floor in the fuselage section.

3. The system of claim 2,
wherein the fastening elements are at least one floor rail.

4. The system of claim 1,
wherein the at least one guide element is a combination of a guide rail and at least one runner that is movable in the guide rail.

5. The system of claim 4,
wherein the at least one runner comprises an oblong shape, which allows the runner to shift when the runner is aligned to extend in a direction that is at least substantially parallel to a guide path of the guide rail, and locks the runner in the guide rail given a deviating alignment of the runner.

6. The system of claim 1,
wherein the at least one guide element is configured for operation from a location inside the cabin module.

7. The system of claim 1,
wherein the at least one stowage compartment comprises an opening for locking or releasing the at least one guide element.

8. The system of claim 1,
wherein the at least one stowage compartment comprises at least one locating surface with spaced apart first retaining bodies for accommodating at least one second installation component.

9. The system of claim 8,
wherein the second installation component comprises correspondingly shaped second retaining bodies for establishing a connection with the spaced apart first retaining bodies.

10. The system of claim 1,
wherein the second surface element is a lateral cladding element.

11. A method for manufacturing a vehicle cabin for a vehicle, comprising:
   lifting a first ceiling panel;
   connecting the first ceiling panel with at least one stowage compartment with at least one guide element so that the first ceiling panel is slidable transverse to a longitudinal axis of the vehicle relative to the at least one stowage compartment on the at least one guide element;
   locking the at least one guide element in an assembly position;

lifting the grouping comprised of the first ceiling panel and the at least one stowage compartment;

arranging at least one second ceiling panel on the stowage compartment to form a cabin module;

introducing the cabin module into a fuselage section of the vehicle;

sliding at least the first ceiling panel relative to the at least one guide element to move the cabin module from a first outer dimension associated with the assembly position to a second outer dimension associated with an operating position, the second outer dimension greater than the first outer dimension;

locking the cabin module in the operating position; and attaching the cabin module in the fuselage section.

12. An aircraft, comprising:

at least one fuselage section;

a floor arranged in the at least one fuselage section; and at least one cabin module secured to the floor of the at least one fuselage section, the at least one cabin module comprising:

at least one stowage compartment;

at least one ceiling panel; and at least one guide element, wherein the ceiling panel is slidable transverse to a longitudinal axis of the aircraft relative to the first installation component by the at least one guide element, and the at least one guide element is lockable into at least one assembly position and at least one operating position, in the assembly position, the ceiling panel is in a first position relative to the at least one stowage compartment such that the cabin module has a first outer dimension, and in the operating position, the ceiling panel is in a second position relative to the at least one stowage compartment such that the cabin module has a second outer dimension that is larger than the first outer dimension; and wherein the cabin module forms at least one section of a cabin in the fuselage section in the operating position.

13. The aircraft of claim 12, further comprising fastening elements configured to secure the cabin module to the floor in the fuselage section.

14. The aircraft of claim 13, wherein the fastening elements are at least one floor rail.

15. The aircraft of claim 12, wherein the at least one guide element is a combination of a guide rail and at least one runner that is movable in the guide rail.

16. The aircraft of claim 15, wherein the at least one runner comprises an oblong shape, which allows the runner to shift when the runner is aligned to extend in a direction that is at least substantially parallel to a guide path of the guide rail, and locks the runner in the guide rail given a deviating alignment of the runner.

17. The aircraft of claim 12, wherein the at least one wide element is configured for operation from a location inside the cabin module.

18. The aircraft of claim 12, wherein the at least one stowage compartment comprises an opening for locking or releasing the at least one guide element.

* * * * *